United States Patent
Allimant et al.

(10) Patent No.: US 11,731,883 B2
(45) Date of Patent: Aug. 22, 2023

(54) POWDER FOR COATING AN ETCH CHAMBER

(71) Applicant: SAINT-GOBAIN CENTRE DE RECHERCHES ET D'ETUDES EUROPEEN, Courbevoie (FR)

(72) Inventors: Alain Allimant, Caumont Sur Durance (FR); Howard Wallar, Rutland, MA (US)

(73) Assignee: SAINT-GOBAIN CENTRE DE RECHERCHES ET D'ETUDES EUROPEEN, Courbevoie (FR)

(*) Notice: Subject to any disclaimer, the term of this patent is extended or adjusted under 35 U.S.C. 154(b) by 490 days.

(21) Appl. No.: 16/965,255

(22) PCT Filed: Jan. 31, 2019

(86) PCT No.: PCT/EP2019/052438
§ 371 (c)(1),
(2) Date: Jul. 27, 2020

(87) PCT Pub. No.: WO2019/149854
PCT Pub. Date: Aug. 8, 2019

(65) Prior Publication Data
US 2021/0115548 A1    Apr. 22, 2021

(30) Foreign Application Priority Data
Jan. 31, 2018   (FR) ...................................... 1850821

(51) Int. Cl.
*C23C 4/10*   (2016.01)
*C01F 17/206*   (2020.01)
(Continued)

(52) U.S. Cl.
CPC ............ *C01G 27/02* (2013.01); *C01F 17/206* (2020.01); *C04B 35/10* (2013.01); *C04B 35/48* (2013.01);
(Continued)

(58) Field of Classification Search
CPC ....... C01G 27/02; C01F 17/206; C04B 35/10; C04B 35/48; C04B 35/505; C01P 2002/34; C01P 2004/50; C23C 4/10
See application file for complete search history.

(56) References Cited

U.S. PATENT DOCUMENTS

| | | | |
|---|---|---|---|
| 6,916,534 B2 | 7/2005 | Wataya et al. | |
| 7,931,836 B2 | 4/2011 | Xie et al. | |

(Continued)

FOREIGN PATENT DOCUMENTS

| | | | |
|---|---|---|---|
| EP | 1167565 A2 | 1/2002 | |
| EP | 1239055 A2 | 9/2002 | |

(Continued)

OTHER PUBLICATIONS

International Search Report corresponding to International Application No. PCT/EP2019/052438 dated Apr. 8, 2019, 6 pages.

*Primary Examiner* — Karl E Group
*Assistant Examiner* — Cameron K Miller
(74) *Attorney, Agent, or Firm* — Ronald M. Kachmarik; Cooper Legal Group LLC

(57) ABSTRACT

A powder of melted particles, more than 95% by number of the particles exhibiting a circularity of greater than or equal to 0.85. The powder including more than 99.8% of a rare earth metal oxide and/or of hafnium oxide and/or of an aluminum oxide, as percentage by mass based on the oxides.

(Continued)

The powder has a median particle size $D_{50}$ of less than 15 µm, a 90 percentile of the particle sizes, $D_{90}$, of less than 30 µm, and a size dispersion index $(D_{90}-D_{10})/D_{10}$ of less than 2, and a relative density of greater than 90%. The $D_n$ percentiles of the powder are the particle sizes corresponding to the percentages, by number, of n % on the cumulative distribution curve of the size of the particles in the powder and the particle sizes are classified by increasing order.

16 Claims, 2 Drawing Sheets

(51) Int. Cl.
- *C04B 35/10* (2006.01)
- *C04B 35/48* (2006.01)
- *C04B 35/505* (2006.01)
- *C01G 27/02* (2006.01)

(52) U.S. Cl.
CPC ............. *C04B 35/505* (2013.01); *C23C 4/10* (2013.01); *C01P 2002/34* (2013.01); *C01P 2004/50* (2013.01)

(56) References Cited

U.S. PATENT DOCUMENTS

| | | |
|---|---|---|
| 2006/0116274 A1 | 6/2006 | Kitamura et al. |
| 2007/0077363 A1 | 4/2007 | Kitamura et al. |
| 2008/0112873 A1 | 5/2008 | Aoki et al. |
| 2011/0129399 A1 | 6/2011 | Xie et al. |
| 2013/0288037 A1* | 10/2013 | Sun .................. C04B 35/505 428/312.8 |

FOREIGN PATENT DOCUMENTS

| | | |
|---|---|---|
| WO | 2010/103497 A2 | 9/2010 |
| WO | 2014/083544 A1 | 6/2014 |

* cited by examiner

POWDER FOR COATING AN ETCH CHAMBER

TECHNICAL FIELD

The invention relates to a powder suitable for deposition by plasma, to a process for manufacturing such powder, and to a coating obtained by plasma spraying of said powder, more particularly for a semiconductor etch chamber coating.

PRIOR ART

The internal surfaces of the chambers used to treat (for example by plasma etch) semiconductors, silicon wafers for example, are conventionally protected with a ceramic coating which is applied by plasma spraying. This coating needs to have high resistance to halogen-comprising plasmas or highly corrosive environments. Plasma spraying requires, as a feed powder, a powder which exhibits high fluidity and a particle morphology which allows for appropriate heating during spraying. More particularly, the size of the particles must be sufficient for the particles to penetrate the plasma and for limiting the evaporation losses.

For example, the very fine powders obtained directly by pyrolytic or chemical manufacturing processes are not suitable for plasma spraying without an additional step of consolidation to form more large (and porous) agglomerates, more particularly sintered agglomerates. Since plasma spraying does not result in the melting of all the agglomerates, the resulting coating exhibits porosity. The total porosity of the coating obtained by spraying of sintered agglomerates is typically 2-3%, which would not be appropriate for protecting the internal surfaces of a semiconductor etching chamber. More particularly, the sintered powders described in U.S. Pat. No. 6,916,534, US 2007/077363 or US 2008/0112873 are unable to lead to a very dense coating by thermal spraying. Moreover, the coatings obtained from porous agglomerates result, over time, in the release of particles when they are exposed to corrosive environments.

U.S. Pat. No. 7,931,836 or US 2011/0129399 disclose a particle powder resulting from plasma melting to form liquid droplets which solidify in free fall. In some embodiments, more than 90% of the particles of starting material may be completely or partially converted into liquid form. The bulk density of the resulting powder is between 1.2 and 2.2 g/cm$^3$.

In the application cited above, the powders obtained by grinding a melted mass are not appropriate either, because of impurities which are added during the grinding step.

Rare earth metal oxides and/or hafnium oxide and/or yttrium-aluminum oxides are known to exhibit high intrinsic resistance to chemical attack. However, they have a high melting temperature and low thermal diffusion. It is therefore difficult to obtain a very dense coating from these particles by plasma spraying.

To solve these problems, WO 2014/083544 describes a powder of particles, more than 95% by number of said particles exhibiting a circularity of greater than or equal to 0.85, said powder comprising more than 99.8% of a rare earth metal oxide and/or of hafnium oxide and/or of an aluminum oxide, as percentage by mass based on the oxides, and having:
  a medium particle size $D_{50}$ of between 10 and 40 microns and a size dispersion index relative to $D_{50}$, $(D_{90}-D_{10})/D_{50}$, of less than 3;
  a percentage by number of particles having a size of less than or equal to 5 μm which is less than 5%;
  a bulk density dispersion index $(P_{<50}-P)/P$ of less than 0.2,
  the cumulative specific volume of the pores having a radius of less than 1 μm being less than 10% of the bulk volume of the powder,
  in which the percentiles $D_n$ of the powder are the particle sizes corresponding to the percentages, by number, of n %, on the cumulative distribution curve of the size of the particles in the powder, the particle sizes being classified by increasing order,
  the density $P_{<50}$ being the bulk density of the fraction of the particles having a size of less than or equal to $D_{50}$, and the density P being the bulk density of the powder.

This powder can be efficiently sprayed by plasma, with a high productivity, and leads to a very pure and extremely dense coating.

There is nevertheless an ongoing need for a semiconductor etch chamber coating that exhibits increased erosion resistance and a reduced number of defects.

It is an aim of the invention to meet this need while retaining the advantages of the powder of WO 2014/083544.

SUMMARY OF THE INVENTION

With this aim, the invention provides a powder (hereinafter "feed powder") of melted particles (hereinafter "feed particles"), more than 95% by number of said particles exhibiting a circularity of greater than or equal to 0.85, said powder comprising more than 99.8% of a rare earth metal oxide, for example of $Yb_2O_3$ or $Y_2O_3$, and/or of hafnium oxide and/or of an aluminum oxide, as percentage by mass based on the oxides, and having:
  a median particle size $D_{50}$ of less than 15 μm, a 90 percentile of the particle sizes, $D_{90}$, of less than 30 μm, and a size dispersion index relative to the 10 percentile of the particle sizes, $D_{10}$, $(D_{90}-D_{10})/D_{10}$, of less than 2;
  a relative density of greater than 90%, preferably greater than 95%, the cumulative specific volume of the pores having a radius of less than 1 μm being preferably less than 10% of the bulk volume of the powder.

A feed powder according to the invention is therefore a very pure powder, composed in large part of spherical particles. This powder is notable more particularly for the very low size dispersion of the particles, relative to $D_{10}$, the small amount of particles having a size of greater than 30 μm, and for a very high relative density.

This latter feature implies a very low, or even substantially zero, amount of hollow particles. The particle size distribution ensures very uniform melting during spraying.

Lastly, a feed powder according to the invention exhibits a high flowability, hence allowing the coating to be manufactured without a complicated feed device.

In the present invention, the term "oxide" may include the simple oxide but also a more complex oxide such as oxyfluoride, an example being yttrium or ytterbium oxyfluoride.

A feed powder in accordance with the invention may also comprise one or more of the following optional features:
  more than 95%, preferably more than 99%, preferably more than 99.5% by number of said particles have a circularity of greater than or equal to 0.87, preferably greater than or equal to 0.90;
  the powder comprises more than 99.9%, more than 99.950%, more than 99.990%, preferably more than 99.999% of a rare earth metal oxide and/or of hafnium oxide and/or of an aluminum oxide, more particularly of YAG; the amount of the other oxides is therefore so low that it cannot have a significant effect on the results obtained with a feed powder according to the invention;

the oxides represent more than 98%, more than 99%, more than 99.5%, more than 99.9%, more than 99.95%, more than 99.985% or more than 99.99% of the mass of the powder;

said rare earth metal is selected from the group consisting of scandium (Sc), yttrium (Y), lanthanum (La), and lanthanides;

preferably, the rare earth metal is selected from yttrium (Y), cerium (Ce), neodymium (Nd), samarium (Sm), dysprosium (Dy), gadolinium (Gd), erbium (Er), ytterbium (Yb), and lutetium (Lu); preferably, said rare earth metal is yttrium;

the aluminum oxide is an yttrium-aluminum oxide composite, preferably YAG (yttrium-aluminum garnet $Y_3Al_5O_{12}$, comprising approximately 58% by mass of yttrium oxide) and/or YAP (yttrium-aluminum perovskite, comprising approximately 68.9% by mass of yttrium oxide);

the percentage by number of particles having a size of less than or equal to 5 µm is greater than 5%, preferably greater than 10%;

the percentage by number of particles having a size of greater than or equal to 0.5 µm is greater than 10%;

the median size of the particles ($D_{50}$) in the powder is greater than 0.5 µm, preferably greater than 1 µm, or even greater than 2 µm, and/or less than 13 µm, preferably less than 12 µm, preferably less than 10 µm or less than 8 µm;

the 10 percentile ($D_{10}$) of the particle sizes is greater than 0.1 µm, preferably greater than 0.5 µm, preferably greater than 1 µm, or else greater than 2 µm;

the 90 percentile ($D_{90}$) of the particle sizes is less than 25 µm, preferably less than 20 µm, preferably less than 15 µm;

the 99.5 percentile ($D_{99.5}$) of the particle sizes is less than 40 µm, preferably less than 30 µm;

the size dispersion index $(D_{90}-D_{10})/D_{10}$ is preferably less than 1.5; this results advantageously in a superior coating density;

preferably, the powder exhibits a monomodal particle size dispersion, in other words a single main peak;

the powder comprises, as percentage by mass based on the oxides, more than 99.8% of $Yb_2O_3$ and/or $Y_2O_3$ and/or $Y_3Al_5O_{12}$ and/or of an yttrium oxyfluoride, preferably of the formula $Y_aO_bF_c$ in which a is equal to 1, b is between 0.7 and 1.1, and c is between 1 and 1.5, preferably an oxyfluoride selected from YOF and $Y_5O_4F_7$ or a mixture of these oxyfluorides;

the cumulative specific volume of the pores with a radius of less than 1 µm is less than 8%, preferably less than 6%, preferably less than 5%, preferably less than 4%, preferably less than 3.5% of the bulk volume of the powder;

the specific surface area of the feed powder is preferably less than 0.4 m²/g, preferably less than 0.3 m²/g.

The invention further concerns a process for manufacturing a feed powder according to the invention, comprising the following successive steps:

a) granulating a particulate charge so as to obtain a granule powder having a median size $D'_{50}$ of between 20 and 60 microns, the particulate charge comprising more than 99.8% of a rare earth metal oxide and/or of hafnium oxide and/or of an aluminum oxide, as percentage by mass based on the oxides;

b) injecting said granule powder, via a carrier gas, through at least one injection orifice to a plasma jet generated by a plasma gun, under conditions which give rise to the bursting before melting of more than 50%, preferably more than 60%, preferably more than 70%, preferably more than 80%, preferably more than 90% by number of the granules injected, as percentage by number, then melting the granules and pieces of granules so as to obtain droplets;

c) cooling said droplets, so as to obtain a feed powder according to the invention;

d) optionally, performing particle size selection, preferably by sieving or by pneumatic classification, on said feed powder.

In step b), the injection conditions are different from those described in WO 2014/083544, which, on page 14, recommends gentle injection for limiting the risks of bursting.

The forceful injection of the powder has the advantageous effect of allowing simultaneously a reduction in the median size of the feed powder and a reduction in the proportion of hollow particles. It so makes it possible to obtain a very high relative density.

Preferably, the plasma gun has a power of greater than 40 kW, preferably greater than 50 kW and/or less than 65 kW, preferably less than 60 kW.

Preferably, the plasma gun has a power of between 40 to 65 KW and the ratio of the quantity by mass of granules injected via injection orifice, preferably by each injection orifice, to the surface area of said injection orifice is greater than 10, preferably greater than 15, preferably greater than 16, preferably greater than or equal to 17 g/min per mm² of surface area of said injection orifice.

The injection orifice, preferably each injection orifice, consists preferably of a channel with a length greater than one time, preferably two times, or even 3 times the equivalent diameter of said injection orifice.

Preferably, the flow rate of the granule powder injected is less than 2.4, preferably less than 2.0 g/min per KW of power of the plasma gun.

There is no intermediate sintering step, and preferably no consolidation between steps a) and b). This absence of an intermediate consolidation step has the advantageous effect of improving the purity of the feed powder. It also facilitates the bursting of the granules in step b).

A process for manufacturing a powder according to the invention may also comprise one or more of the following optional features:

in step a), the granulation is preferably a process of atomization or spray drying or pelletization (conversion into pellets);

in step a), the mineral composition of the granule powder comprises more than 99.9%, more than 99.95%, more than 99.99%, preferably more than 99.999%, of an oxide of a rare earth metal and/or of hafnium oxide and/or of aluminum oxide, as percentage by mass based on the oxides;

The median circularity $C_{50}$ of the granule powder is preferably greater than 0.85, preferably greater than 0.90, preferably greater than 0.95, and more preferably greater than 0.96;

the 5 circularity percentile of the granule powder, $C_5$, is preferably greater than or equal to 0.85, preferably greater than or equal to 0.90;

the median aspect ratio $A_{50}$ of the granule powder is preferably greater than 0.75, preferably greater than 0.8;

The specific surface area of the granule powder is preferably less than 15 m²/g, preferably less than 10 m²/g, preferably less than 8 m²/g, preferably less than 7 m²/g;

the cumulative volume of the pores having a radius of less than 1 μm, measured by mercury porosimetry, of the granule powder is preferably less than 0.5 cm³/g, preferably less than 0.4 cm³/g or else preferably less than 0.3 cm³/g;

the bulk density of the granule power is preferably greater than 0.5 g/cm³, preferably greater than 0.7 g/cm³, preferably greater than 0.90 g/cm³, preferably greater than 0.95 g/cm³, preferably less than 1.5 g/cm³, preferably less than 1.3 g/cm³, preferably less than 1.1 g/cm³;

the 10 percentile ($D'_{10}$) of the particle sizes of the granule powder is preferably greater than 10 μm, preferably greater than 15 μm, preferably greater than 20 μm;

the 90 percentile ($D'_{90}$) of the particle sizes of the granule powder is preferably less than 90 μm, preferably less than 80 μm, preferably less than 70 μm, preferably less than 65 μm;

the granule powder preferably has a median size $D'_{50}$ of between 20 and 60 microns; the granule powder preferably has a percentile $D'_{10}$ of between 20 and 25 μm and a $D'_{90}$ of between 60 and 65 μm;

the 99.5 percentile ($D'_{99.5}$) of the particle sizes of the granule powder is preferably less than 100 μm, preferably less than 80 μm, preferably less than 75 μm;

the size dispersion index relative to $D'_{50}$, $(D'_{90}-D'_{10})/D'_{50}$, of the granule powder is preferably less than 2, preferably less than 1.5, preferably less than 1.2, more preferably less than 1.1;

in step b), the diameter of each injection orifice is less than 2 mm, preferably less than 1.8 mm, preferably less than 1.7 mm, preferably less than 1.6 mm;

in step b), the injection conditions are equivalent to those of a plasma gun having a power of 40 to 65 kW and generating a plasma jet in which the quantity by mass of granules injected via an injection orifice, preferably via each injection orifice, in g/min per mm² of the surface area of said injection orifice is greater than 10 g/min per mm², preferably greater than 15 g/min per mm²; by "equivalent" is meant "adapted such that the rate of bursting of the granules (number of burst granules over number of granules injected) is identical";

an injection orifice, preferably each injection orifice, defines an injection channel which is preferably cylindrical, preferably circular in section, having a length at least one time, preferably at least two times, or even three times greater than the equivalent diameter of said injection orifice, the equivalent diameter being the diameter of a disk with the same surface area as the injection orifice;

in step b), the flow rate of granule powder is less than 3 g/min, preferably less than 2 g/min, per kW of power of the plasma gun;

the flow rate of the carrier gas (per injection orifice (i.e., per "powder line")) is greater than 5.5 l/min, preferably greater than 5.8 l/min, preferably greater than 6.0 l/min, preferably greater than 6.5 l/min, preferably greater than 6.8 l/min, preferably greater than 7.0 l/min;

the granule powder is injected into the plasma jet at a feed rate of greater than 20 g/min, preferably greater than 25 g/min, and/or less than 60 g/min, preferably less than 50 g/min, preferably less than 40 g/min, per injection orifice;

the total feed rate of granules (cumulative for all the injection orifices) is greater than 70 g/min, preferably greater than 80 g/min, and/or preferably less than 180 g/min, preferably less than 140 g/min, preferably less than 120 g/min, preferably less than 100 g/min;

preferably, in step c), the cooling of the molten droplets is such that, up to 500° C., the mean cooling rate is between 50 000 and 200 000° C./s, preferably between 80 000 and 150 000° C./s.

The invention likewise concerns a thermal spraying process comprising a step of plasma spraying of a feed powder according to the invention to a substrate in order to obtain a coating.

The invention likewise concerns a body comprising a substrate and a coating at least partially covering said substrate, said coating comprising more than 99.8% of a rare earth metal oxide and/or of hafnium oxide and/or an aluminum oxide, as percentage by mass based on the oxides, and exhibiting a porosity of less than or equal to 1.5%, said porosity being measured on a photograph of a polished section of said coating, as described below. Preferably, the porosity of the coating is less than 1%.

Preferably, the coating comprises more than 99.9%, more than 99.95%, more than 99.97%, more than 99.98%, more than 99.99%, preferably more than 99.999% of a rare earth metal oxide and/or of hafnium oxide and/or of an aluminum oxide, as percentage by mass based on the oxides.

A coating of this kind may be manufactured with a thermal spraying process according to the invention.

The substrate may be a wall of an oven used in the treatment of semiconductors, and more particularly the wall of a plasma etch chamber.

The oven may contain semiconductors, more particularly silicon wafers. The oven may be equipped with chemical vapor deposition (CVD) means or with physical vapor deposition (PVD) means.

Definitions

The "impurities" are the unavoidable constituents which are unintentionally and necessarily introduced with the starting materials or result from reactions between the constituents. The impurities are not necessary constituents but only tolerated constituents. The level of purity is preferably measured by GDMS (glow discharge mass spectroscopy) which is more precise than ICP-AES (inductively coupled plasma-atomic emission spectrometry).

The "circularity" of the particles of a powder is typically determined as follows: the powder is dispersed on a flat glass. The images of the individual particles are obtained by scanning the dispersed powder under an optical microscope, while keeping the particles in focus, the powder being illuminated from the underside of the glass. These images can be analyzed using a Morphologi® G3 instrument, sold by Malvern.

As represented in FIG. 4, to evaluate the "circularity" C of a particle P', a determination is made of the perimeter $P_D$ of the disk D having an area equal to the area $A_p$ of the particle on an image of this particle. Also determined is the perimeter $P_p$ of this particle. The circularity is equal to the ratio $P_D/P_p$. Hence $$C = \frac{2*\sqrt{\pi A_p}}{P_p}.$$

The more elongated the shape of the particle, the lower the circularity. This procedure is also described by the user manual for the Sysmex FPIA 3000 (see "detailed specification sheets" at www.malvern.co.uk).

To determine a percentile of circularity (described hereinafter), the powder is poured onto a flat glass and observed as explained above. The number of particles counted should be greater than 250 so that the percentile measured is substantially identical whichever way the powder is poured over the glass.

The aspect ratio A of a particle is defined as the ratio of the width of the particle (its greatest dimension perpendicular to the direction of its length) to its length (its greatest dimension).

To determine a percentile of aspect ratio, the powder is poured onto a flat glass and observed as explained above, for measuring the lengths and the widths of the particles. The number of particles counted should be greater than 250 so that the percentile measured is substantially identical whichever the way in which the powder is poured on the glass.

The 10 ($M_{10}$), 50 ($M_{50}$), 90 ($M_{90}$), and 99.5 ($M_{99.5}$), and more generally "n" $M_n$, percentiles or "centiles" of a property M of the particles of a particle powder are the values of this property for the percentages, by number, of 10%, 50%, 90%, 99.5%, and n %, respectively, on the cumulative distribution curve relating to this property of the particles in the powder, with the values relating to this property being classified by increasing order. More particularly, the percentiles $D_n$ (or $D'_n$ for the granule powder), $A_n$, and $C_n$, relate to the size, the aspect ratio, and the circularity, respectively.

For example, 10% by number of the particles in the powder have a size of less than $D_{10}$, and 90% of the particles by number have a size of greater than or equal to $D_{10}$. The percentiles relating to the size may be determined by means of a particle size distribution produced by means of a laser particle sizer.

Similarly, 5% by number of particles in the powder have a circularity less than the percentile $C_5$. In other words, 95% by number of particles in this powder have a circularity greater than or equal to $C_5$.

The 50 percentile is conventionally called the "median" percentile. For example, $C_{50}$ is typically called "median circularity". Similarly, the percentile $D_{50}$ is typically called "median size". The percentile $A_{50}$ also refers typically to the "median aspect ratio".

"Size of a particle" refers to the size of a given particle conventionally by a characterization of particle size distribution that is carried out with a laser particle sizer. The laser particle sizer used may be a Partica LA-950 from HORIBA.

The percentage or the fraction by number of particles having a size of less than or equal to a determined maximum size may be determined by means of a laser particle sizer.

The cumulative specific volume of the pores with a radius of less than 1 µm, expressed as $cm^3/g$ powder, is typically measured by mercury porosimetry in accordance with standard ISO 15901-1. It may be measured with Micromeritics porosimeter.

The bulk volume of powder, expressed in $cm^3/g$, is the inverse of the bulk density of the powder.

The "bulk density" P of a particle powder is typically defined as the ratio of the mass of the powder divided by the sum of the bulk volumes of said particles. In practice, it may be measured with a Micromeritics porosimeter at a pressure of 200 MPa.

The "relative density" of a powder is equal to its bulk density divided by its real density. The real density may be measured by helium pycnometry.

The "porosity" of a coating may be evaluated by analyzing images of a polished cross section of the coating. The coated substrate is sectioned using a laboratory cutter, for example using a Struers Discotom device with an alumina-based cutting disk. The sample of the coating is then mounted in a resin, for example using a cold mounting resin of the Struers Durocit type. The mounted sample is then polished using polishing media of increasing fineness. Use may be made of abrasive paper or, preferably, of polishing disks with an appropriate polishing suspension. A conventional polishing procedure starts with the dressing of the sample (for example with a Struers Piano 220 abrasive disk), then by changing the polishing cloths associated with the abrasive suspensions. The size of abrasive grains is reduced at each fine polishing step, with the size of the diamond abrasives beginning, for example, at 9 microns, then at 3 microns, finishing at 1 micron (Struers DiaPro series). For each size of abrasive grain, the polishing is halted as soon as the porosity observed under an optical microscope remains constant. The samples are carefully cleaned between the steps, with water, for example. A final polishing step, after the 1 µm diamond polishing step, is carried out by means of colloidal silica (OP-U Struers, 0.04 µm) in combination with a soft felt cloth. After the cleaning, the polished sample is ready for observation with an optical microscope or with an SEM (scanning electron microscope). Owing to its superior resolution and notable contrast, the SEM is preferred for the production of images intended for analysis. The porosity may be determined from the images by using image analysis software (for example, ImageJ, NIH), with the thresholding being adjusted. The porosity is given as a percentage of the surface area of the cross section of the coating.

The "specific surface area" is conventionally measured by the BET (Brunauer Emmet Teller) method, as described in the *Journal of the American Chemical Society* 60 (1938), pages 309 to 316.

The "granulating" operation is a process for agglomeration of particles by means of a binder, a binder polymer for example, to form agglomerated particles, which may possibly be granules. The granulation comprises, more particularly, the atomization or spray drying and/or the use of a granulator or of a pelletizing apparatus, but is not limited to these processes. Typically, the binder comprises substantially no oxides.

A "granule" is an agglomerated particle having a circularity of 0.8 or more.

A consolidation step is an operation which is intended to replace, in the granules, the bonds due to organic binders with diffusion bonds. It is generally carried out by a heat treatment, but without complete melting of the granules.

The "deposition yield" of a plasma spraying process is defined as the ratio, as percentage by mass, of the amount of material deposited on the substrate divided by the amount of feed powder injected into the plasma jet.

The "spraying productivity" is defined as the amount of material deposited per unit time.

The flow rates in l/min are "standard", meaning that they are measured at a temperature of 20° C. under a pressure of 1 bar.

"Comprising" should be understood non-limitatively, unless otherwise indicated.

Unless otherwise indicated, all of the composition percentages are percentages by mass based on the mass of the oxides.

The properties of the powder may be evaluated by the characterization methods used in the examples.

BRIEF DESCRIPTION OF THE FIGURES

Other features and advantages of the invention will emerge more clearly from the reading of the description which is to follow and the examination of the appended drawings, in which.

DETAILED DESCRIPTION

Process for Manufacturing a Feed Powder

Figure 1:
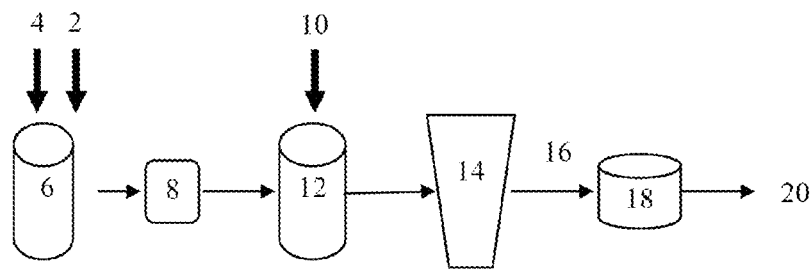
FIG. 1 represents schematically step a) of a process according to the invention.

FIG. 1 illustrates one embodiment of step a) of a process for manufacturing a feed powder according to the invention.

Any known granulation process may be used. More particularly, the skilled person knows how to prepare a slip suitable for granulation.

In one embodiment, a binder mixture is prepared by adding PVA (polyvinyl alcohol) 2 to deionized water 4. This binder mixture 6 is then filtered through a 5 μm filter 8. A particulate charge consisting of powdered yttrium oxide 10 (with a purity, for example, of 99.99%) having a medium size of 1 μm is mixed into the filtered binder mixture to form a slip 12. The slip may comprise by mass, for example, 55% of yttrium oxide and 0.55% of PVA, the balance to 100% being made up of water. This slip is injected into an atomizer 14 to give a granular powder 16. The skilled person knows how to adapt the atomizer to obtain the desired particle size distribution.

The granules are preferably agglomerates of particles of an oxide material exhibiting a medium size of preferably less than 3 μm, preferably less than 2 μm, preferably less than 1.5 μm.

Preferably, to manufacture a feed powder in which the particles comprise a mixed oxide or oxyfluoride phase, for example yttrium or ytterbium oxyfluoride, or a YAG or YAP phase, granules are used which preferably already comprise this phase, these being, respectively, granules formed of grains of yttrium or ytterbium oxyfluoride, YAG or YAP.

The granule powder may be sieved (5 mm sieve 18, for example) to remove the possible presence of residues which have fallen from the walls of the atomizer The resulting powder 20 is a "spray-dried only (SDO)" granule powder.

Figure 2:
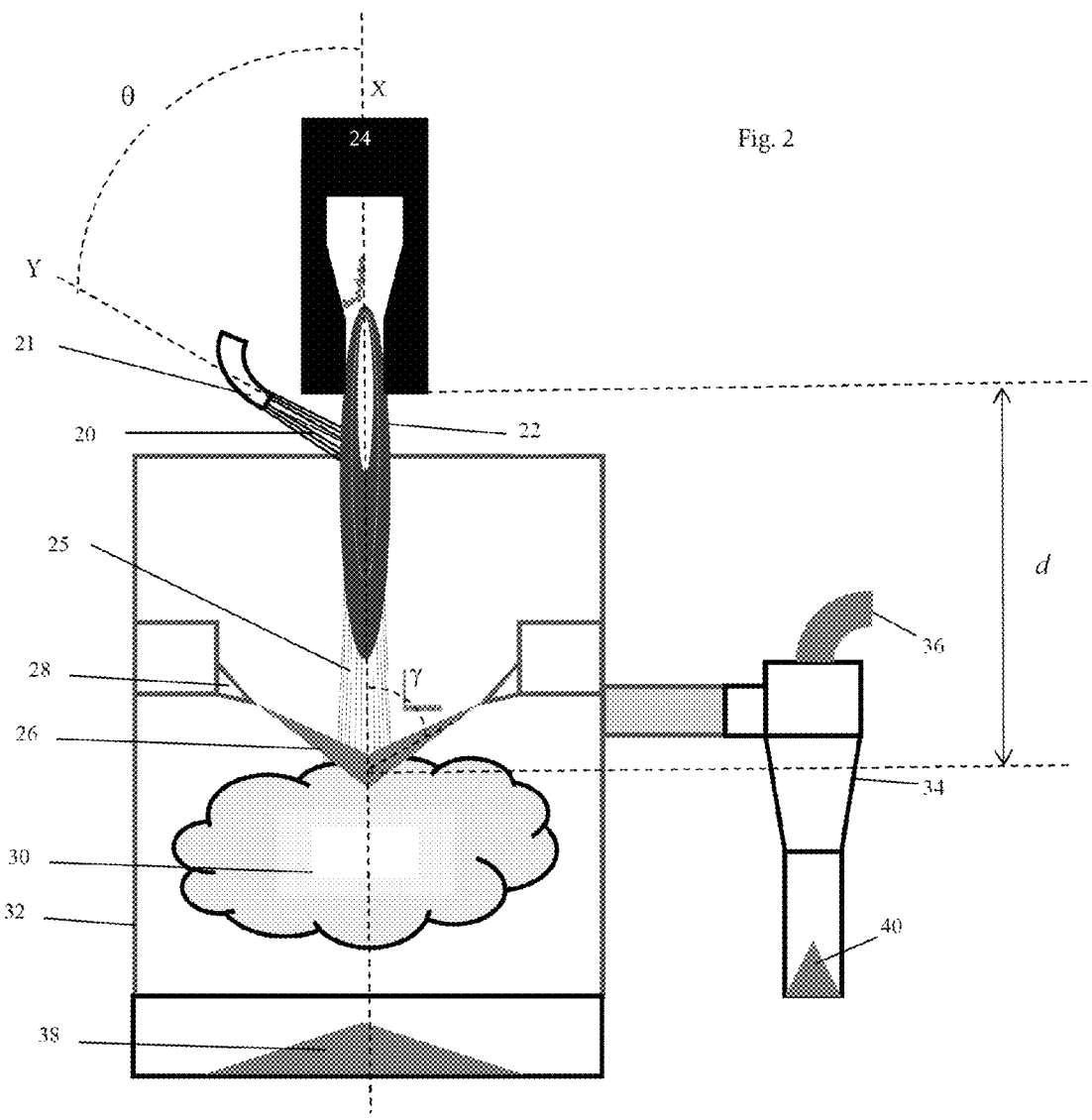
FIG. 2 represents schematically a plasma torch for manufacturing a feed powder according to the invention.
Figure 3:
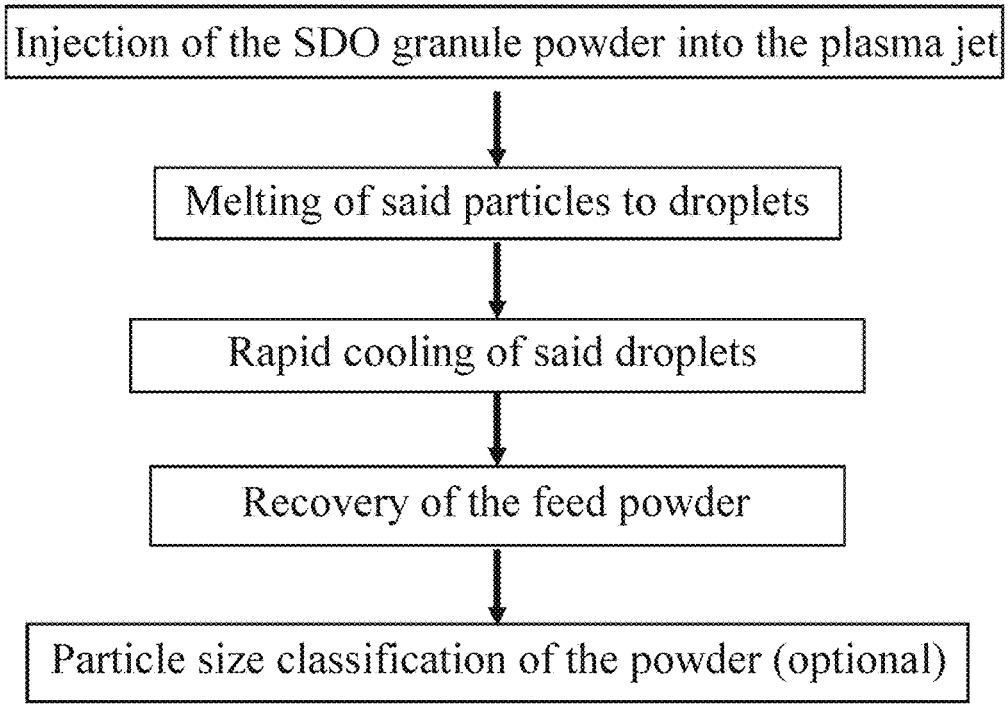
FIG. 3 represents schematically a process for manufacturing a feed powder according to the invention.
Figure 4:
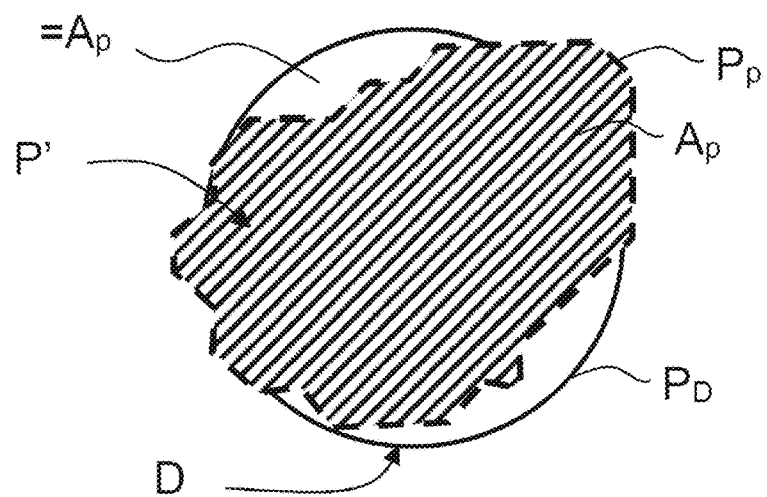
FIG. 4 illustrates the technique used to evaluate the circularity of a particle.

FIGS. 2 and 3 illustrate one embodiment of the melting step b) of a process for manufacturing a feed powder according to the invention.

An SDO granule powder 20, for example, as manufactured by the process illustrated in FIG. 1, is injected by an injector 21 into a plasma jet 22 produced by a plasma gun 24, for example, of a ProPlasma HP plasma torch. Conventional injection and plasma spraying devices may be used, such as to mix the SDO granule powder with a carrier gas and to inject the resulting mixture into the heart of the hot plasma.

However, the granule powder injected need not be consolidated (SDO), and injection into the plasma jet must be done vigorously, to promote granule breaking. The force of the impacts determines the intensity of bursting of the granules, and hence the median size of the powder manufactured.

The skilled person knows how to adapt the injection parameters for vigorous injection of the granules such that the feed powder obtained at the end of steps c) or d) has a particle size distribution according to the invention.

More particularly, the skilled person is aware that:
an approximation to 90° of the angle of injection θ between the axis of injection of the granules Y and the axis X of the plasma jet,
an increase in the flow rate of powder per mm$^2$ of surface area of the injection orifice,
a reduction in the flow rate of powder, in g/min, per kW of power of the gun, and
an increase in the flow rate of the plasma-forming gas are factors which promote the breaking of the granules.

More particularly, WO2014/083544 does not disclose injection parameters enabling the breaking of more than 50% by number of granules, as described in the examples below.

It is preferable for the particles to be injected rapidly so as to disperse them in a very viscous plasma jet which flows at a very high speed.

When the granules injected come into contact with the plasma jet, they are subjected to forceful impacts, which may break them into pieces. In order to penetrate the plasma jet, the unconsolidated, and more particularly unsintered, granules to be dispersed are injected with a sufficiently high speed to benefit from a high kinetic energy, this speed, however, being limited so as to ensure highly effective bursting. The absence of consolidation of the granules reduces their mechanical strength and therefore their resistance to these impacts.

The skilled person is aware that the speed of granules is determined by the flow rate of the carrier gas and the diameter of the injection orifice.

The speed of the plasma jet is also high. The flow rate of plasma-forming gas is preferably greater than the median value recommended by the constructor of the torch for the anode diameter selected. Preferably, the flow rate of plasma-forming gas is greater than 50 l/min, preferably greater than 55 l/min.

The skilled person is aware that the speed of the plasma jet may be increased using a small-diameter anode and/or by raising the flow rate of the primary gas.

Preferably, the flow rate of the primary gas is greater than 40 l/min, preferably greater than 45 l/min.

Preferably, the ratio between the flow rate of secondary gas, preferably dihydrogen ($H_2$), and the flow rate of plasma-forming gas (composed of the primary and secondary gases) is between 20% and 25%.

Of course, the energy of the plasma jet, influenced particularly by the flow rate of the secondary gas, must be sufficiently high to cause the granules to melt.

The granule powder is injected with a carrier gas, preferably without any liquid.

In the plasma jet 22, the granules are melted to droplets 25. The plasma gun is preferably regulated so that the melting is substantially complete.

An advantageous effect of the melting is to reduce the level of impurities.

On their exit from the hot zone of the plasma jet, the droplets are rapidly cooled by the surrounding cold air, but also by forced circulation 26 of a cooling gas, preferably air. The air advantageously limits the reducing effect of the hydrogen.

The plasma torch preferably comprises at least one nozzle arranged so as to inject a cooling fluid, preferably air, so as to cool the droplets resulting from the heating of the granule powder injected into the plasma jet. The cooling fluid is preferably injected to downstream of the plasma jet (as represented in FIG. 2), and the angle γ between the path of said droplets and the path of the cooling fluid is preferably less than or equal to 80°, preferably less than or equal to 60° and/or greater than or equal to 10°, preferably greater than or equal to 20°, preferably greater than or equal to 30°. Preferably, the axis of injection Y of any nozzle and the axis X of the plasma jet are secant.

Preferably, the angle of injection θ between the axis of injection Y and the axis X of the plasma jet is greater than 85°, and preferably is approximately 90°.

Preferably, the forced cooling is generated by an assembly of nozzles 28 positioned around the axis X of the plasma jet 22, such as to create a substantially conical or annular flow of cooling gas.

The plasma gun 24 is oriented vertically toward the ground. Preferably, the angle α between the vertical and the axis X of the plasma jet is less than 30°, less than 20°, less than 10°, preferably less than 5°, preferably substantially zero. Advantageously, the flow of cooling gas is therefore perfectly centered with respect to the axis X of the plasma jet.

Preferably, the minimum distance d between the outer surface of the anode and the cooling zone (where the droplets come into contact with the injected cooling fluid) is between 50 mm and 400 mm, preferably between 100 mm and 300 mm.

Advantageously, the forced cooling limits the generation of secondaries, resulting from the contact between very large, hot particles and small particles in suspension in the densification chamber 32. Moreover, a cooling operation of this kind enables a reduction in the overall size of the treatment equipment, more particularly the size of the collecting chamber.

The cooling of the droplets 25 makes it possible to obtain feed particles 30, which can be extracted in the lower part of the densification chamber 32.

The densification chamber may be connected to a cyclone 34, the exhaust gases from which are directed to a dust collector 36, so as to separate off very fine particles 40. Depending on configuration, some feed particles in accordance with the invention may also be collected in the cyclone. Preferably, these feed particles can be separated off, more particularly with an air separator.

The collected feed particles 38 may when appropriate be filtered, so that the median size $D_{50}$ is less than 15 microns.

Table 1 below provides the preferred parameters for manufacturing a feed powder according to the invention.

The features of a column are preferably, but not necessarily, combined. The features of the two columns may also be combined.

The "ProPlasmaHP" plasma torch is sold by Saint-Gobain Coating Solutions. This torch corresponds to the torch T1 described in WO2010/103497.

TABLE 1

|  | Preferred features | Even more preferred features |
| --- | --- | --- |
| Step b) | | |
| Gun | High-performance gun with low wear (for treating the powder without contaminating it) | ProPlasma HP gun |
| Anode | Diameter > 7 mm | HP8 anode (diameter of 8 mm) |
| Cathode | Doped tungsten cathode | ProPlasma cathode |
| Gas injector | Partially radial injection (swirling gas injection) | ProPlasma HP setup |
| Current | 500-700 A | 650 A |
| Power | >40 kW | >50 kW, preferably approximately 54 kW |
| Nature of primary gas | Ar or $N_2$ | Ar |
| Flow rate of primary gas | >40 l/min, preferably >45 l/min | 50 l/min |
| Nature of secondary gas | $H_2$ | $H_2$ |
| Flow rate of secondary gas | >20 vol % of the plasma-forming gas mixture | 25 vol % of the plasma-forming gas mixture |
| Injection of the granule powder | | |
| Total flow rate of powder injected (g/min) (3 injection orifices) | <180 g/min | <100 g/min |
| Flow rate in g/min per kW of power | <5 | <2 |
| Diameter of injection orifices (mm) | <2 mm preferably <1.8 mm | ≤1.5 mm |
| Flow rate in g/min per mm² of surface area of injection orifice | >10 | >15 and <20 |

TABLE 1-continued

| | Preferred features | Even more preferred features |
|---|---|---|
| Type of carrier gas | Ar or $N_2$ | Ar |
| Flow rate of carrier gas per injection orifice | >6.0 l/min, Preferably >6.5 l/min | ≥7.0 l/min |
| Injection angle relative to the X axis of the plasma jet (angle θ in FIG. 2) | >85° | 90° |
| Distance between an injection orifice and the axis X of the plasma jet | >10 mm | ≥12 mm |
| Cooling of the droplets | | |
| Cooling parameters | Conical or annular air curtain, oriented in the downstream direction of the plasma jet | |
| Angle γ between the direction of injection of the cooling fluid, from a nozzle, and the axis X of the plasma jet | In the downstream direction of the plasma jet, ≥10° | In the downstream direction of the plasma jet, ≥30° and <60° |
| Total flow rate of the forced cooling fluid | 10-70 $Nm^3/h$ | 35-50 $Nm^3/h$ |
| Flow rate of the exhaust gas | 100-700 $Nm^3/h$ | 250-500 $Nm^3/h$ |

EXAMPLES

The examples which follow are provided for purposes of illustration and do not limit the scope of the invention.

The feed powders H1, I1 (comparative) and C1 (comparative) were manufactured with a plasma torch similar to the plasma torch shown in FIG. 2 of WO2014/083544, from a pure $Y_2O_3$ powder having a median size $D_{50}$ of 1.2 microns, measured with a Horiba laser particle analyzer, and a chemical purity of 99.999% of $Y_2O_3$.

In step a), a binder mixture is prepared by adding PVA (polyvinyl alcohol) binder 2 (see FIG. 1) to deionized water 4. This binder mixture is then filtered through a 5 μm filter 8. The yttrium oxide powder 10 is mixed into the filtered binder mixture to form a slip 12. The slip is prepared so as to comprise, as percentage by mass, 55% of yttrium oxide and 0.55% of PVA, the balance to 100% being deionized water. The slip is mixed intensely using a high-shear speed mixer.

The granules G3 are subsequently obtained by atomization of the slip, using an atomizer 14. More particularly, the slip is atomized in the chamber of a GEA Niro SD 6.3 R atomizer, the slip being introduced at a flow rate of approximately 0.38 l/min.

The speed of the rotating atomization wheel, driven by a Niro FS1 motor, is regulated to give the target sizes of the granules 16 (G3).

The flow rate of air is adjusted to maintain the entry temperature at 295° C. and the exit temperature close to 125° C., such that the residue moisture content of the granules is between 0.5% and 1%.

The granule powder is then sieved with a sieve 18 so as to extract the residues from it and to give an SDO granule powder 20.

In step b), the granules from step a) are injected into a plasma jet 22 (see FIG. 2) produced with a plasma gun 24. The injection and melting parameters are given in table 2 below.

In step c), to cool the droplets, 7 Silvent 2021L nozzles 28, sold by Silvent, were fixed on a Silvent 463 annular nozzle holder, sold by Silvent. The nozzles 28 are spaced regularly along the annular nozzle holder, so as to generate a substantially conical flow of air.

The collection yield of the collected feed particles 38 is the ratio of the amount of feed particles collected to the total amount of granules injected into the plasma jet.

TABLE 2

| Treatment of the powder | Dried by spraying + plasma spraying | | |
|---|---|---|---|
| Granules (particles obtained after spray drying) | | | |
| Granule reference | G3 | | |
| Type of granules | Spray-dried yttrium oxide powder | | |
| Granules $D_{10}$ (μm) | 23.4 | | |
| Granules $D_{50}$ (μm) | 39.0 | | |
| Granules $D_{90}$ (μM) | 63.0 | | |
| Mean bulk density | 1.05 | | |
| Step b): injection | | | |
| Feed rate of granules | 120 g/min | | 90 g/min |
| Flow rate in g/min per KW of power of the gun | 2.5 | | 1.9 |
| Number of injection orifices (powder lines) | 3 | | |
| Injection angle θ relative to the axis X of the plasma jet (FIG. 2) | 80° in downstream dir. | | 90° (normal to the jet) |
| Distance of each injector (radially from the axis of the gun) | 12 mm | 14 mm | 12 mm |
| Diameter of the injection orifice of each injector | 2.0 mm | 1.8 mm | 1.5 mm |
| Flow rate of the argon carrier gas per injection orifice | 3.5 l/min | 6.0 l/min | 7.0 l/min |
| Flow rate in g/min per $mm^2$ of injection orifice surface area | 12.7 | 16 | 17 |

TABLE 2-continued

| Step b): melting | | | |
|---|---|---|---|
| Plasma gun | | ProPlasma HP | |
| Diameter of the anode of the plasma gun | | 8 mm | |
| Voltage (V) | | 74 | 83 |
| Power (kW) | | 48 | 54 |
| Plasma-forming gas mixture | | Ar + H$_2$ | |
| Flow rate of the plasma-forming gas | | 48 l/min | 67 l/min |
| Proportion of H$_2$ (secondary gas) in the plasma-forming gas | | 25% | |
| Nature of the primary gas | | Ar | |
| Calculated flow rate of the primary gas | | 48*(100 − 25)/100% = 36 l/min | 50 l/min |
| Intensity of the plasma arc | | 650 A | |
| Step c): cooling | | | |
| Annular cooling nozzles | | 7 Silvent 2021L nozzles attached to Silvent 463 | |
| Total flow rate of cooling air Nm$^3$/h) | 0 | 42 | 42 |
| Flow rate of air in the cyclone (Nm$^3$/h) | 650 | 350 | 650 |
| Collection yield of feed particles | 54% | 20% | 44% |
| Feed particles collected (feed powder) | | | |
| Reference | I1 | C1 | H1 (inventive) |
| D$_{10}$ (μm) | 15.7 | 10.0 | 7.0 |
| D$_{50}$ (μm) | 24.9 | 22.0 | 11.7 |
| D$_{90}$ (μm) | 37.2 | 35.0 | 17.0 |
| (D$_{90}$ − D$_{10}$)/D$_{10}$ | 1.4 | 2.5 | 1.4 |
| Fraction by number: ≥37 μm | 10% | 9% | <0.5% |
| Fraction by number: ≥30 μm | 27% | 23% | <0.5% |
| Fraction by number: ≤10 μm | 1.8% | 10.3% | 33% |
| Fraction by number: ≤5 μm | 0.9% | 5.1% | 3% |
| Median circularity C$_{50}$ | 0.993 | 0.982 | >0.85 |
| Specific surface area (m$^2$/g) | 0.44 | 0.57 | 0.26 |
| Level of impurities measured by GDMS | | <150 ppm | |
| Bulk density measured by mercury porosimetry at a pressure of 3.5 KPa | 2.37 | 2.53 | Not measured |
| Calculated bulk density | 0.47 | 0.50 | |
| Bulk density measured by mercury porosimetry at a pressure of 200 MPa | 4.25 | 4.43 | 4.60 |
| Calculated relative density in % | 84 | 88 | 91 |
| Cumulative specific volume of the pores having a radius of less than 1 micron 10$^{-3}$ cm$^3$/g of the powder sample) | 13 | 7 | 11 |

The cumulative specific volume of the pores having a radius of less than 1 μm in the granules was $260 \times 10^{-3}$ cm$^3$/g.

The invention thus provides a feed powder having a size distribution and a relative density which endow the coating with a very high density. Furthermore, this feed powder can be efficiently sprayed by plasma, with a high productivity.

The feed powder according to the invention so makes it possible to produce coatings having a smaller concentration of defects. Furthermore, the powder exhibits enhanced flowability in relation to a powder of the same size which has not been plasma-melted, so enabling injection without a complex feed means.

The invention is of course not limited to the embodiments described and shown.

The invention claimed is:

1. A powder of melted particles, more than 95% by number of said particles exhibiting a circularity of greater than or equal to 0.85, said powder comprising more than 99.8% of a rare earth metal oxide and/or of hafnium oxide and/or of an aluminum oxide, as percentage by mass based on the oxides, and having:

a median particle size D$_{50}$ of less than 15 μm, a 90 percentile of the particle sizes, D$_{90}$, of less than 30 μm, and a size dispersion index (D$_{90}$−D$_{10}$)/D$_{10}$ of less than 2;

a relative density of greater than 90%, the D$_n$ percentiles of the powder being the particle sizes corresponding to the percentages, by number, of n %, on the cumulative distribution curve of the size of the particles in the powder, the particle sizes being classified by increasing order.

2. The powder as claimed in claim 1, exhibiting a percentage by number of particles having a size of less than or equal to 5 μm which is greater than 5%, and/or a median particle size D$_{50}$ of less than 10 μm, and/or a 90 percentile of the particle sizes, D$_{90}$, of less than 25 μm, and/or a 99.5 percentile of the particle sizes, D$_{99.5}$, of less than 40 μm, and/or a size dispersion index (D$_{90}$−D$_{10}$)/D$_{10}$ of less than 1.5.

3. The powder as claimed in claim 1, in which the median size of the particles, D$_{50}$, is less than 8 μm.

4. The powder as claimed in claim 1, comprising, as percentage by mass based on the oxides, more than 99.8% of $Yb_2O_3$ and/or $Y_2O_3$ and/or $Y_3Al_5O_{12}$ and/or of an yttrium oxyfluoride.

5. A process for manufacturing a powder as claimed in claim 1, said process comprising the following steps:
   a) granulating a particulate charge so as to obtain a granule powder having a median size $D'_{50}$ of between 20 and 60 microns, the particulate charge comprising more than 99.8% of a rare earth metal oxide and/or of hafnium oxide and/or of an aluminum oxide, as percentage by mass based on the oxides;
   b) injecting said granule powder, via a carrier gas, through at least one injection orifice to a plasma jet generated by a plasma gun, under injection conditions which give rise to the bursting of more than 50% of the granules injected, as percentage by number, so as to obtain molten droplets, the flow rate of the granule powder injected being less than 2 g/min per KW of plasma gun power, and the ratio of the quantity by mass of granules injected via said injection orifice, preferably by each injection orifice, to the surface area of said injection orifice being greater than 16 g/min per mm² of surface area of said injection orifice;
   c) cooling said molten droplets, so as to obtain a feed powder as claimed in any one of the preceding claims;
   d) optionally, performing particle size selection on said feed powder.

6. The process as claimed in claim 5, in which the injection conditions are determined such as to bring about the bursting of more than 70% of the granules injected, as percentage by number.

7. The process as claimed in claim 6, in which the injection conditions are determined such as to bring about the bursting of more than 90% of the granules injected, as percentage by number.

8. The process for manufacturing a powder as claimed in claim 5, in which, in step b), the injection conditions are adapted to bring about a degree of granule bursting identical to a plasma gun having a power of 40 to 65 KW and generating a plasma jet in which the quantity by mass of granules injected via each injection orifice, in g/min per mm² of the surface area of said injection orifice, is greater than 10 g/min per mm².

9. The process as claimed in claim 8, in which the quantity by mass of granules injected via each injection orifice, in g/min per mm² of the surface area of said injection orifice, is greater than 15 g/min per mm².

10. The process for manufacturing a powder as claimed in claim 5, in which said injection orifice defines an injection channel having a length at least one time greater than the equivalent diameter of said injection orifice.

11. The process as claimed in claim 10, in which said length is at least two times greater than said equivalent diameter.

12. The process for manufacturing a powder as claimed in claim 5, in which, in step b), the flow rate of granule powder is less than 3 g/min per kW of plasma gun power.

13. The process as claimed in claim 5, in which the granulation comprises an atomization.

14. A thermal spraying process comprising a step of thermal spraying of a powder as claimed in claim 1.

15. The powder as claimed in claim 1, comprising, as percentage by mass based on the oxides, more than 99.8% of $Yb_2O_3$ and/or $Y_2O_3$ and/or $Y_3Al_5O_{12}$ and/or of an yttrium oxyfluoride of the formula $Y_aO_bF_c$ in which a is 1, b is between 0.7 and 1.1, and c is between 1 and 1.5.

16. The powder as claimed in claim 1, comprising, as percentage by mass based on the oxides, more than 99.8% of $Yb_2O_3$ and/or $Y_2O_3$ and/or $Y_3Al_5O_{12}$ and/or of an oxyfluoride selected from YOF and $Y_5O_4F_7$ or a mixture of these oxyfluorides.

* * * * *